United States Patent [19]

Mathieu et al.

[11] Patent Number: 4,555,736
[45] Date of Patent: Nov. 26, 1985

[54] DISC AND VIDEODISC READER HEAD POSITIONING CONTROL SYSTEM

[76] Inventors: Michel G. Mathieu, La Loirie Vezin-le-Coquet, 35590 L'Hermitage; Andre J. L. Le Rodallec, 7, Square de Varsovie, 35000 Rennes, both of France

[21] Appl. No.: 369,977

[22] Filed: Apr. 19, 1982

Related U.S. Application Data

[63] Continuation-in-part of Ser. No. 42,988, May 29, 1979, abandoned, which is a continuation of Ser. No. 753,994, Dec. 27, 1976, abandoned.

[30] Foreign Application Priority Data

Dec. 29, 1975 [FR] France .................................. 75 40403

[51] Int. Cl.⁴ ........................ H04N 5/76; G11B 21/00
[52] U.S. Cl. ..................................... 358/342; 369/32; 369/33; 369/41
[58] Field of Search ..................................... 369/32-33, 369/41; 358/342; 365/234; 360/78

[56] References Cited

U.S. PATENT DOCUMENTS

| | | | |
|---|---|---|---|
| 3,530,447 | 9/1970 | Lambert | 179/100.4 D |
| 3,654,624 | 4/1972 | Becker et al. | 365/127 |
| 3,662,350 | 5/1972 | Chertok | 365/230 |
| 3,662,363 | 5/1972 | Chertok | 179/100.4 D |
| 3,737,877 | 6/1973 | Feinleib | 179/100.3 V |
| 3,956,766 | 5/1976 | Hanson et al. | 360/78 |
| 3,962,688 | 6/1976 | Westerberg | 365/234 |
| 4,031,443 | 6/1977 | Droux et al. | 360/78 |
| 4,094,010 | 6/1978 | Pepperl et al. | 365/234 |
| 4,094,013 | 6/1978 | Hill et al. | 365/234 |
| 4,142,232 | 2/1979 | Harvey | 179/100.4 D |

OTHER PUBLICATIONS

Broad Bent, "Review of the MCA Disco-Vision System", last page, 4/74, paper from the SMPTE Tech. Conf. (115), L.A., Ca.

*Primary Examiner*—Robert L. Richardson
*Attorney, Agent, or Firm*—Jordan B. Bierman

[57] ABSTRACT

A videodisc reader head positioning control system stores the keyed-in address for a desired picture frame and compares it to the track address for the frames during passage of the reader head toward the desired frame. Logic circuitry distinguishes the difference between the desired address and the address of the head's current position in order to control the head positioning unit at a fast, intermediate, or precision speed. Upon reaching the desired address, the logic circuitry maintains the position of the head for stop frame display of the picture information.

5 Claims, 7 Drawing Figures

DISC AND VIDEODISC READER HEAD POSITIONING CONTROL SYSTEM

This application is a continuation-in-part of our copending application Ser. No. 42,988 now abandoned filed May 29, 1979, which in turn is a continuation of our application Ser. No. 753,994 filed Dec. 27, 1976, now abandoned; said prior applications claim the priority of French application 75 40403 filed Dec. 29, 1975.

The present invention concerns a system for controlling the positioning of the head of a video-disc reader, which permits in particular the selection on a video-disc of a picture or image or a sequence of pictures or images.

Video-discs are now known means for registering picture or data signals. Video-discs exist which use optical reading and reading by capactive effects and also with electro-mechanical reading. In the following, one will consider more particularly, a video-disc with optical reading, although the system according to the invention is applicable likewise to other types of video-discs. On most video-discs, one television frame per turn is recorded, the recording relating to the complete video signal, including frame and line synchronization signals. The speed of rotation of the video-disc is 1,500 turns/min. for Europe, which corresponds to 25 frames per second or 1,800 turns/min. for the U.S. which corresponds to 30 frames per second. The recording is of the type with frequency modulation of the carrier signal, and in the case of an optical reading, the information is represented on the disc by a succession of micro-pits of variable frequency and length, the optical reading of which detects the leading edges. At present, there are known video-discs of 33 centimeters diameter, the reading duration of which is 27 minutes. In Europe where reading is at the rate of 25 frames per second, or a frame every 40 milliseconds, this duration corresponds to the recording of about 40,000 frames on one disc. The result is that the distance between two adjacent grooves is $\frac{2}{3}$ microns which renders very difficult the positioning of the reading head on the groove of the frame.

Generally, the grooves of a video-disc form, like those of an ordinary sound recording disc, from a spiral which follows the reader. When the video-disc is used as a memory bank of fixed pictures of medical data for rapid access, it is necessary to provide a system of stopping on a frame permitting the reading at least for a certain time of the same picture. Such a system is known. It consists of shifting backwards by one groove the reading head at the time of the period of suppression of the odd field of the frame read. In a known method, this shifting by one groove backwards is produced by an impulse applied to the positioning means of the reading head, this impulse being produced during the period of suppression of the odd field from a signal extracted from the recorded video-signal. One may likewise envisage utilizing reading a video-disc where the grooves are concentric circles with a stop page on a frame of the disc, the reading head being shifted forward for a continuous reading of a sequence of frames.

An object of the present invention consists in providing a system of controlling the positioning of the head of a video-disc reader, permitting the reading with a stop on any picture selected by an operator, for example with the aid of a keyboard, among the plurality of pictures recorded on the video-disc, the pictures being assumed arranged of course from the outside to the inside of the disc (or vice-versa). By way of example, such a reading mode with stop on a selected picture may be used when it is desired to read data of the picture selected, consult the picture before passing to the following one if the pictures form part of a catalogue, or also positioning the head of the reader on the first picture of a sequence of movable pictures which is then allowed to run in a conventional manner.

In the field of known memory discs with magnetic recording there already exist known systems for positioning a magnetic reading head on a predetermined track. By way of example, there may be cited the systems described in French Patents published under the Nos. 2014491 and 2125852 concerning memory discs with concentric tracks.

One may cite also the type of systems of positioning described in the U.S. Pat. Nos. 3,812,533 and 3,736,565.

The precision of these systems is insufficient to obtain a satisfactory positioning of a reading head in respect of a video-disc. In fact, it requires a matter of positioning the head by a few microns to select any frame among about 40,000 on an effective radial segment of 10–12 cm. To reduce the searching time for a frame, one must utilize, as in known systems, a rapid displacement mechanism for a coarse approach, and a slow displacement mechanism for a fine approach, and even possibly an additional displacement mechanism operating at intermediate speed. The grooves are so close together that it is difficult to count in the course of displacement, at rapid or intermediate speed, the number of grooves passed by the head. In other respects, at least for optical reading heads, the disc may be displaced in respect of a fixed reading head rather than displacing the head as in the conventional systems. The central hole of the disc, however, may have a less precise circumference, especially after a certain amount of wear, than the distance between two grooves and one then no longer has a geometrical reference sufficiently precise to serve as a starting point for the measurement of the displacement.

In the systems described in U.S. Pat. Nos. 3,812,533 and 3,736,565 already mentioned, it should be noted that the end of the search at slow speed is effected without its being possible to stop the displacement mechanism, and the precision of these systems is therefore insufficient to position correctly the reading head of a videodisc.

Furthermore, it is known to inscribe on a memory track an indication permitting its identification.

Thus, in French Patent No. 2198337, a system in which each frame is accompanied by an identity mark is described. However, in the course of the positioning, one compares directly the desired track number with the track identity, in a continual manner. One cannot therefore effect, in the course of the positioning, a reading of track identity in the picture stop mode.

One object of the present invention consists in providing a system of control of positioning in which information provided by the displacement mechanism of the reading head is combined with the indicated identity of the picture desired, and the identity read on a picture in order to make the indicated identity and the identity read coincide.

Another object of the invention consists in providing a system of control of positioning which permits, in particular at the end of the positioning operation, reading track identity in the stop picture mode which satisfies the practical conditions of positioning the reading head of a video-disc.

According to one feature of the present invention there is provided a system of controlling the positioning of the head of a disc reader, and in particular a video-disc operable in a picture stop mode, the reader being provided with displacement means for the head and an assembly of information such as that of a television frame being recorded on each turn of the video-disc, each assembly or frame comprising a first indication of identity. The control system comprises a control keyboard permitting to display and write the desired picture identity into a first memory, a detector circuit fed by the reading head to detect the first indication of identity and write it into a second memory, a control circuit comprising an up/down counter, the initializing input of which is connected to the output of the second memory, and the output of which is connected to the first output of a first comparator, the second input of which is connected to the output of the first memory, and the output of which is connected to a logical decision circuit determining the direction of displacement of the head and controlling the displacement means which in operating, delivers to the up/down counter impulses with the algebraic sign corresponding to the direction of displacement representing the displacement of the head in number of grooves, the initialization of the up/down counter by the contents of the second memory being effected every time the output of the first comparator has a value zero.

According to a preferred feature, the keyboard comprises a validation key which the operator depresses when the desired identity and the identity displayed on the keyboard are identical, and which permits enabling the first initialization of the up/down counter.

According to another preferred feature, each frame comprises a second indication of identity identical with the first indication of identity, but angularly spaced thereof, the detector circuit detecting successively the first and the second indication of identity at each turn of the disc, and the control circuit further comprising a third memory connected to the output of the second memory, and a second comparator the first input of which is connected to the output of the second memory and the second output of which is connected to the output of the third memory, the output of the second comparator being connected to an input of an AND circuit, the other input of which is connected to the validation key, and the output of which is connected to the initialization enable input of the up/down counter.

The features of the invention which have been mentioned above as well as others will appear more clearly on reading the following description of one embodiment, the said description being given in relation to the attached drawings in which.

Figure 1:
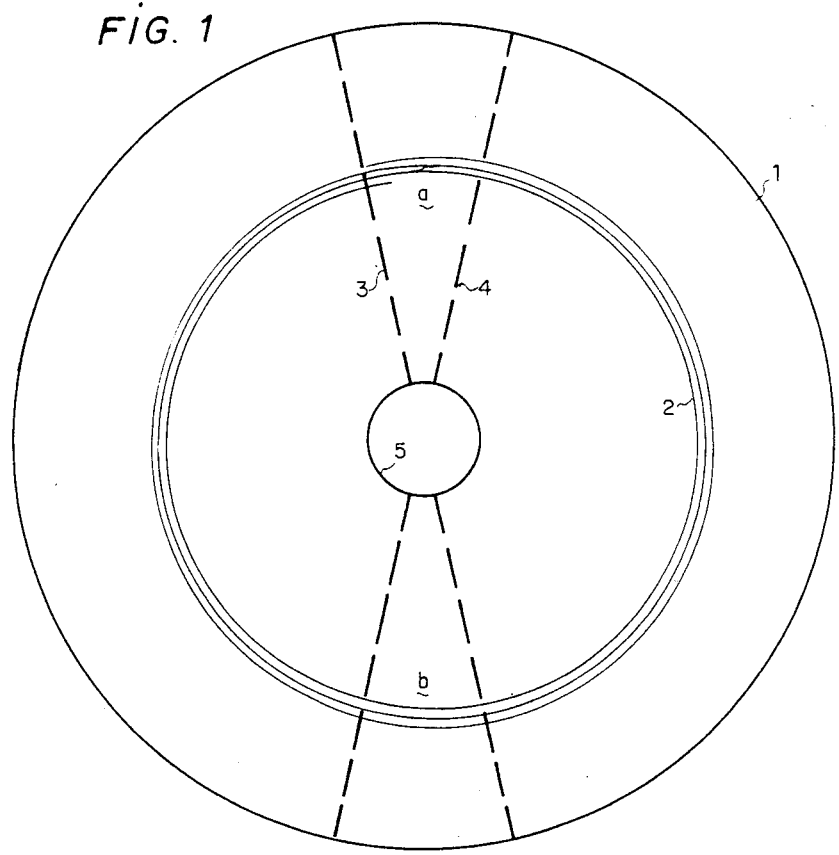
FIG. 1 is a diagrammatic view in plan of a video-disc.
Figure 2A:
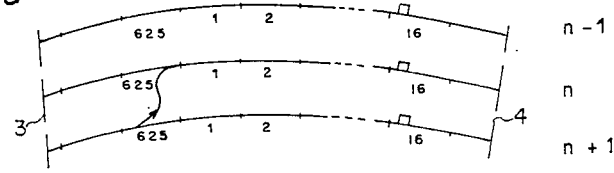
FIG. 2a is an enlarged diagrammatic view of the zone a of FIG. 1.

The video-disc 1 shown in FIG. 1 has a conventional spirally wound disc groove 2. Upon each turn is recorded a television picture frame, that is to say, the 625 lines of such a frame (in the case where the standard of television is 625 lines). The recording refers to the complete video-signal with synchronization. The field blanking lines of odd and even fields are located diametrically opposite between the lines 3 and 4 shown in broken lines. At its centre the disc 1 has a circular hole 5 permitting it to be fixed on the reading apparatus. FIG. 2a shows enlarged the zone a of the field blanking lines of the related odd fields by way of example, with frames n−1, n & n+1, whilst FIG. 2b shows the zone b of the field blanking lines of the related even fields of the same frames.

Figure 3:
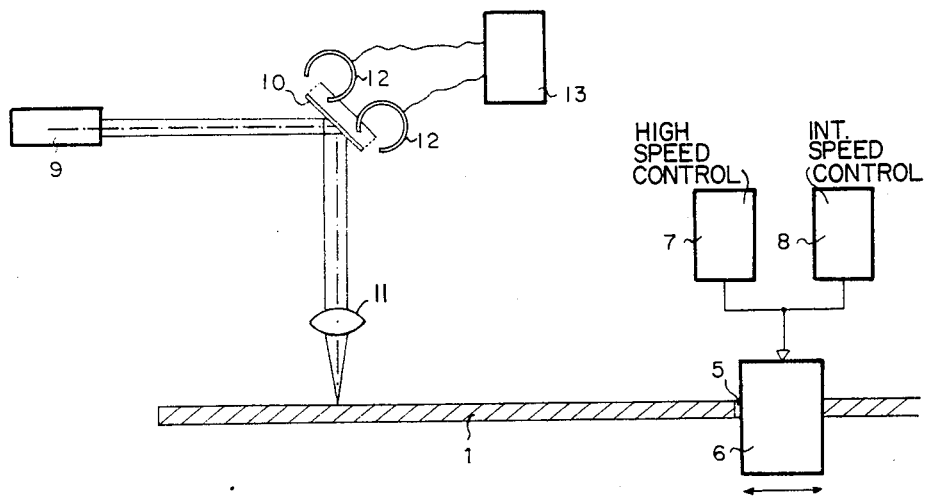
FIG. 3 is a diagrammatic view, in elevation, of a video-disc, of its optical reader head and means for displacement of the video-disc in relation to the reader.

In FIG. 3, the video-disc 1 is mounted on a spindle 6 which turns at 1,500 turns per minute, the spindle 6 being movable to the left or the right by rapid speed traverse means 7 or intermediate speed traverse means 8. In practice, the spindle 6 may be mounted by screws on a carriage, displaceable by 7 or 8 in a known manner. The reader associated with the video-disc is in the described example an optical reader comprising a laser 9 generating a light ray reflected by a vibrating mirror 10 to the surface of the disc 1, through a lens 11, and an opto-electronic detector (not shown). The groove 2 of the disc 1 is composed of a succession of micropits, the edges of which cause the incident light to deviate. The opto-electronic detector may be below the video-disc 1 in the case of optical detection by transparence, or above 1 in the case of optical detection by reflection. The position of the mirror is controlled by electromagnetic coils 12 fed by a circuit 13.

Figure 6:
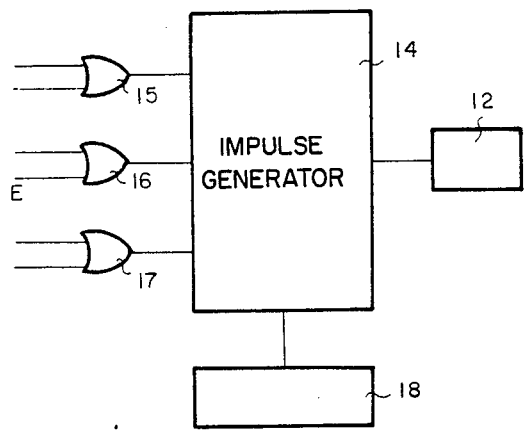
FIG. 6 is a diagram of a circuit used with the control system according to the invention.

In the described example, there is provided radial control of the pencil of light upon the spiral groove 2, which is realized by reflection by means of the vibrating mirror 10. The error signal elaborated from the dispersed light by the micropits acts on the electromagnets 12 actuating the mirror 10. A part of the circuit 13 is shown in FIG. 6. It comprises a calibrated impulse generator 14, the output of which is connected to coils 12, a first input of which is connected from the output of an OR gate 15, a second input of which is connected from the output of an OR gate 16, a third input of which is connected from the output of an OR gate 17, and finally a last input of which is connected from the output of a circuit 18. Each OR gate 15 to 17 has both a manually controlled input and an automatically controlled input. The high condition of output of gate 15 results in the emission by generator impulses of 14 to coils 12 corresponding to backward running whilst the high condition of output of gate 17 results in the emission of impulses to coils 12 corresponding to forward or advance running. The high condition of output of gate 16 switches the generator 14 to the picture stop mode, which, in operation, results in the emission of a backward running impulse each time one reaches the 625th line of a frame, the backward running impulse being released by circuit 18. The OR gate 16 has a manually controlled input, with no reference, and an automatically controlled input E.

Figure 2B:
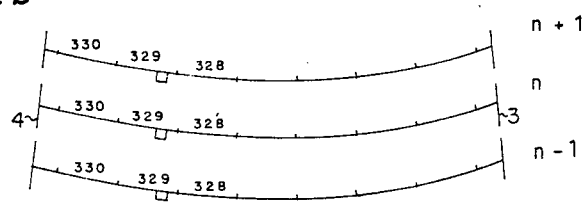
FIG. 2b is an enlarged diagrammatic view of the zone b of FIG. 1.

As FIG. 2a and 2b show, one has in addition, two diametrically opposite lines in each picture which contain a message bearing the identity n of the picture. In the example described, the lines 16 and 329 have been selected, the message being indicated by a rectangle: it is important to note that each frame is identified twice - once in the odd and once in the even field blanking lines.

Figure 5:
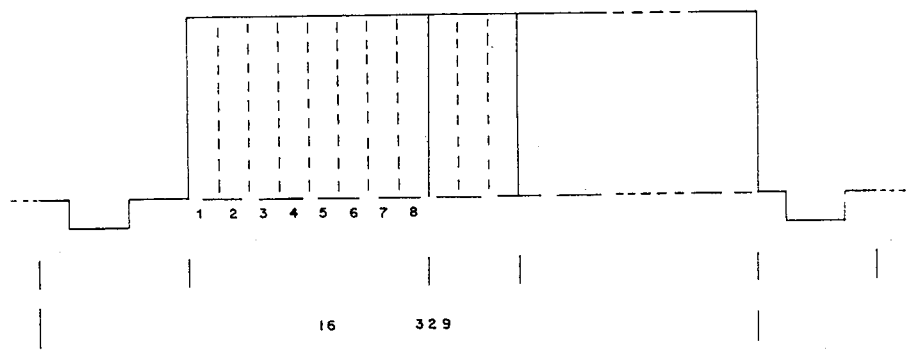
FIG. 5 illustrates the contents of one of the lines of a frame which contains the identity of that frame.

By way of example, the frame identity may be included in a message, the structure of which is illustrated in FIG. 5. Such a message structure has already been described in U.S. Pat. No. 4,058,830 issued to Guinet et al on Nov. 15, 1977. As therein described, the data are arranged in packets, one packet being capable of maximally occupying one television line. Each packet comprises a prefix followed by actual data.

The prefix is constituted by 8 octets, the first two (1 and 2) of which are reserved for the packet synchronization, the following one (3) for the starting signal, the following three (4 to 6) for a particular service and the last two (7 and 8) for format information. Immediately following the prefix, three octets, amply sufficient to represent a number from 1 to about 40,000, are provided to identify the image by its row on the disc. Other data may follow if necessary. It is to be noted that this packet structure permits of easily inserting the video-disc in the means of the emitting station of a system of data diffusion such as that described in the above mentioned U.S. Pat. No. 4,058,830.

Figure 4:
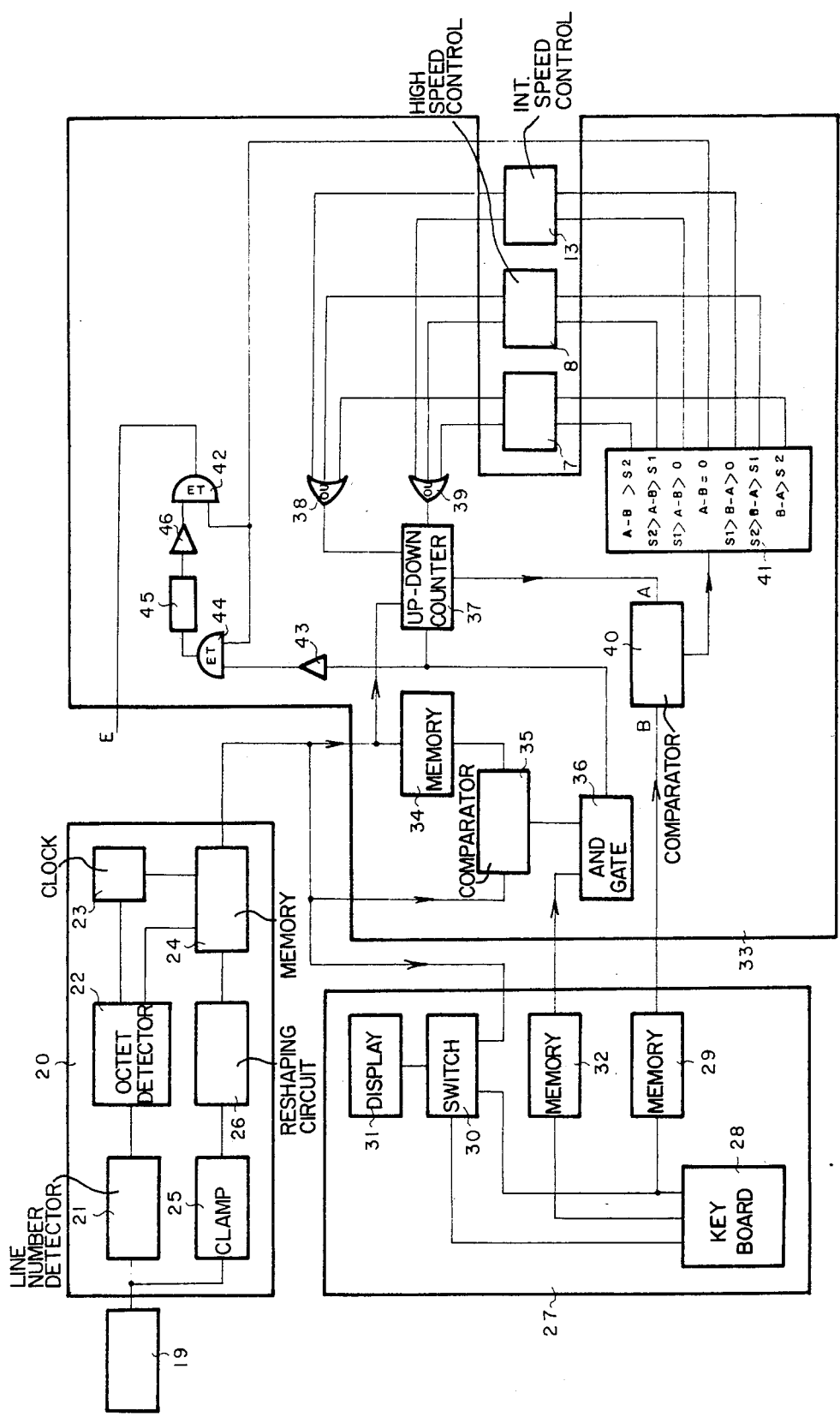
FIG. 4 shows the schematic diagram of the circuit used in the control system according to the invention.

In the diagram of FIG. 4 a video-disc reader 19 which may be the opto-electronic detector previously referred to, is shown as delivering at its output a video signal to the frame identity extracting circuit generally shown at 20. While many circuits are already known for extracting digital data from video signals, circuit 20 is illustrative. Furthermore, once digital data has been extracted it may be processed, and selected data then stored in a memory. In the present case, the selected data is picture identity.

The exemplary circuit 20 comprises an indentity line detector 21 the input of which is connected to the output of 19, and whose output operative only when the received lines are the 16th or the 329th lines, is connected to the input of an octet detection circuit 22 whose one output is connected to the input of clock 23, and whose other output is connected to an input of a memory 24. The circuit 22 first detects synchronization octets 1 and 2 which serve to synchronize the clock 23, and then it detects the starting octet 3. Accordingly, detection circuit 22 prevents data from entering the memory until the starting octet is recognized by the circuit. In addition, the output of 19 is also connected, in circuit 20, to the input of a clamping circuit 25 which is necessary for threshold detection. The output of the clamping circuit is connected to the input of a bit reshaping circuit 26. The output of the latter is conencted to an input of memory 24.

The binary elements identifying the picture are received in the memory 24 between the 40th and the 64th stroke or pulse of the clock 23 which follows the end of the starting octet 3. Consequently, at each reception, in circuit 20, of the line 16 or 329, the indentity of the picture is stored in the memory 24. Thus the contents of memory 24 is refreshed at each line 16 or 329 and the information remains stored therein between two refreshments, which is a relatively long time.

In FIG. 4, there is provided a manual control station generally indicated at 27 which comprises a keyboard 28, the numerical information output of which is connected on the one hand, to the input of a memory 29, and on the other hand by a switch 30, to the input of display device 31. In addition, the keyboard 28 also includes a validation key, the output of which is connected to the clock input of a type D flip-flop 32, and a display selection key, the output of which is connected to the control input of switch 30. A second, digital information input to the switch 30 is connected to the output of the memory 24. The D input of flip-flop 32 is connected from a high level "1". Reset input of flip-flop 32 is in parallel connected from any other key of the keyboard 28. The output of flip-flop 32 is connected to one input of an AND gate 36. Thus, the memory 29 is set when actuating the validation key and reset when any other key of keyboard 28 is actuated.

When an operator has composed on the keyboard 28 the number of a picture desired, this number is transmitted to the memory 29 and to the display 31 by switch 30. The operator can then verify that the number displayed by 31 is indeed that which he desires. If the response is negative, he recommences the keyboard operation. If the response is positive, he depresses the validation key which sets the flip-flop 32. If the operator wishes to see displayed the identity of the picture actually of being read by reader 19, he depresses the display key and the switch 30 connects memory 24 to display device 31.

The circuit of FIG. 4 also includes a control circuit generally indicated at 33 which has a memory 34, the input of which is connected to the output of the memory 24 and the output of which is connected to the first input of a comparator 35. The second input of 35 is directly connected to the output of the memory 24. The output of the comparator 35 is connected to the other input of AND gate 36. One input of gate 36 is connected to the output of the flip-flop 32, and the output of which is connected to the preset enable input of the up/down counter 37. Regarding memory 34, write and read-out operations are clocked by clock signals derived from clock 23 the, write operation being shifted so as to avoid any interference. Comparator 35 is enabled by signals from clock 23 during the time of the write operation to memory 34. Memory 24 is readable just a short time after each time it is refreshed, which operation is timed by signals from clock 23.

The counter 37 has its load input connected from the output of the memory 24 from which it receives the initial data, its counting (increasing or decreasing) input is connected to the output of OR gate 38, its up/down selection input is connected to the output of OR gate 39, and its preset input is connected from the output of AND gate 36. The output of counter 37 is connected to the first input A of a comparator 40, the second input B being connected to the output of the memory 29, and the output of which is connected to the input of a logic decision circuit 41. The comparator 40 delivers at its output a signal which is a function of the algebraic difference between the output signl from 37 and output signal B from 29, respectively, applied to its inputs A and B. In circuit 41 this algebraic signal has its sign analyzed and its absolute value compared with the thresholds S1 and S2. The circuit 41 comprises 7 outputs, the output corresponding to $A-B>S2$ being connected to the advancing input of the means 7 controlling the rapid displacement of the video-disc, the output corresponding to $S2>A-B>S1$ being connected to the advancing input of the means 8 controlling the displacement at intermediate speed of the video-disc, the output corresponding to $S1>A-B>0$ being connected to the input of the means 13 acting on the vibrating mirror 10, the input $A-B=0$ being connected to the first inputs of AND gate 42 and 44, the output corresponding to $S1>B-A>0$ being connected to the other input of the actuating circuit 13, the output S2>B−A>S1 being connected to the reversing input of the means 8, and the output corresponding to B−A>S2 being connected to the reversing input of the means 7. The means 7, 8 and 13 each have an output delivering an impulse when the spindle 6 has been displaced by an amount equal to the distance between two grooves, or when the mirror 10 has displaced the optical pencil by the same distance. The generation of this impulse may be realized as precisely as desired by conventional means such as revolution counters. The first outputs of 7, 8 and 13 are respectively connected to the inputs of the OR gate 38. In addition 7, 8 and 13 each have a second output indicating the displacement sign, the second outputs being connected to the inputs of the OR gate 39. Accordingly, the impulses emitted by 7, 8 or 13 increase or decrease the loaded number initially applied to counter 37 from memory 24 at the moment of starting.

The overall operation of the control circuit 33 is described as follows in relation to that of an assembled video-disc reader. The reader is assumed to operate, at the initial moment, in the mode of a stopped frame. The operator who wishes to consult a given picture enters on the keyboard 28 the identity number of this picture. During this time, the reader 19 reads continuously the initial frame and deduces therefrom in the memory 24 the initial number of this frame. On each updated reading of the line 16 or 329, the preceding contents of memory 24, transmitted to memory 34, are compared with the newly acquired updated contents of memory 24. The two contents of memories 24 and 34 should be identical if the reader is operating in the picture stop mode. The output of comparator 35 then delivers a positive or high signal.

When the identity of the picture desired is entered, the operator ascertains on the display device 31 that there is no error, and operates the validation key which causes a positive signal to be transmitted from flip-flop 32 to AND gate 36. Thus, the two inputs to AND gate 36 are positive, and the AND gate 36 initially presets the counter 37 to the contents of the memory 24. The contents A of counter 37, and the contents B of memory 29 are compared in comparator 40, which transmits the function signal of the algebraic difference between A and B to the logic decision circuit 41 in which such difference is treated or processed. It will now be assumed that A and B are such that the output corresponding to A−B>S2 is activated. The means 7 are set in operation to displace the spindle 6 to the rear or towards the right of FIG. 3. In principle, at each groove pass an impulse is subtracted from counter 37 to reduce the contents A by one. In addition, the method of operation with stoppage at an image is suppressed by OR gate 16, in FIG. 6, the automatic input E of which is no longer in the active state. The comparator 35 delivers a negative or low output signal when its two inputs are different, which avoids reinitializing or restarting the counter 37 through its presetting input. As a result of the displacement of the spindle 6, the difference A−B decreases and passes below the threshold S2, which removes the output to displacement means 7 and produces an output to means 8. The displacement of spindle 6 now proceeds at a slower speed. When the difference A−B subsequently passes below the threshold S1, circuit 41 removes the output to means 8 and provides an output to means 13. The mirror 10 turns, and A−B becomes zero. The reader proceeds to stop on the desired picture as will now be described.

The detector circuit 20 again takes up its normal operation and the memory 24 records the number of the frame on which the reader has stopped. The comparison in 35 takes place and is assumed to yield a positive output. As the flip-flop 32 has been set by the order of validation, the output of AND gate 36 enables counter 37 to be preset with the contents of memory 24. Normally, the number of memory 24 read by counter 37 should be B with the result that the comparator 40 confirms the equality A=B. Otherwise the preceding process is once more repeated until this equality is attained. In order to have confirmation of the number of the picture which is presented, the operator depresses the display key and the number is displayed by display 31. It must be noted therefore that the equality A−B=0 may be obtained even if the means which generate the impulses in 7 and 8 on presumed groove passage are not very precise; in principle, it is enough that control of circuit 13 be precise.

In practice, it may occur that even in the case of the equality A−B=0 the comparator 35 does not deliver a positive signal indicative of identity in lines 16 and 329. In fact, a speck of dust may conceal one piece of information, or the video-disc may have a fault such as a scratch at one of these places. It is then desired to have the picture stop mode operation removed. For this purpose, the output of the AND gate 36 is likewise connected to the input of an inverter 43, the output of which is connected to the first input of an AND gate 44. The second input of AND gate 44 is connected from output "A−B=0" of logic circuit 41, and the output of AND gate 44 is connected to the input of a monostable multivibrator 45, the output of which is connected to one input of an OR gate 46. The output of AND gate 36 is also connected to one input of an AND gate 42, the other input of which is connected from output "A−B=0" of logic circuit 41, and the output of gate 41 is also connected to the other input of OR gate 46. The output of OR gate 46 is connected to the input E of OR gate 16, FIG. 6.

If the output A−B=0 of circuit 41 is positive and the output of AND gate 36 negative, which is produced once the search is terminated before comparator 35 detects the same identities at its inputs, the inverter 43 delivers a high level signal, the output of gate 44 is high, which triggers the monostable multivibrator 45 which, during the time T representing its time constant, delivers a high level at its output. The OR gate 46 delivers a high level which makes the input E of 16 active causing the reader to operate in the picture stop mode. If at the end of the time T, comparator 35 has not recognized the same identity at its two inputs, the circuit 45 delivers a low level to OR gate 46. In addition, AND gate 42 still delivers a low level. Therefore, input E of 16 is disabled and the reader begins to operate on normal running. Accordingly, output A−B=0 of circuit 41 becomes low.

On the contrary, if, before expiration of the time T, comparator 35 has emitted a high level, the output of gate 42 is switched to high level which locks the output of gate 46 to high level, even after circuit 45 is self reset. As output of gate 46 is high, so it is for output of gate 16, and the reader operates in the picture stop mode.

The monostable multivibrator 45 is not a retriggerable monostable device. Its trigger time is monitored by a clock signal from 23.

It appears therefore that the comparator 35 ensures that the frame read is indeed that which is desired by combining two items of information relative to the identity of the latter.

It must also be noted that the system of the invention operates even if there is provided on the video-disc several turns for recording a picture that is for example, two turns with a disc turning at 3,000 turns per minute. In the method of operating with stoppage on a frame, it suffices then to displace the reader by two grooves at a pre-determined moment.

It must also be noted that for recording on a videodisc, a color picture according to the SECAM or PAL languages, it is preferred to record only 624 lines, instead of 625 as indicated in FIG. 2a, to take into account the transmission of color components. However, this modification does not entail any change with regard to the operation of the system of the invention.

It is to be further noted that in the 625 line system in which there are 25 frames or 50 fields per second, the first 25 lines do not carry picture video but are used for synchronization and other service purposes. Among the first 25 lines we have selected the 16th line (and the corresponding 329th line in the second field) for control purposes. Obviously other available lines such as the 15th or 17th would alternatively be acceptable. It must be understood that this description is given only by way of example, and is not intended to limit the scope of the invention.

What is claimed is:

1. A control system for positioning the reader head of a videodisc reader of the type wherein a picture corresponding to a television frame is recorded on a videodisc track, each recorded television frame including an identifying indication, said control system comprising means for operating said videodisc reader in a picture stop mode, a picture identity detector including a first memory for storing the detected picture identity means for providing a desired picture identity including a second memory for storing the desired picture identity, control means for causing a relative movement between said reader head and said videodisc, and a control circuit for said control means, said control circuit comprising an up-down counter, means connecting the output of said first memory to a preset input of said up-down counter, a comparator having one input connected to the output of said up-down counter and a second input connected to said second memory, whereby said comparator provides an output signal indicative of the difference between the desired picture identity and the contents of said up-down counter, a logic decision circuit having its input connected to the output of said comparator, said logic circuit including means responsive to the output of said comparator for operating said control means so as to reduce said difference to nil and simultaneously deliver pulses to said up-down counter corresponding to an output of the control means, said logic circuit having an output delivering a signal when its input signal is nil, said output of said logic circuit enabling said means operating said videodisc in said picture stop mode.

2. A control system according to claim 1, in combination with switching means for alternatively connecting said display means to said picture identity means to display the desired picture identity, or to the output of said first memory to display the detected picture identity whenever said reader is operating in the picture stop mode.

3. A control system according to claim 1, in which the means for providing a desired picture identity further includes a keyboard, and display means for displaying the desired picture identity, said keyboard including a validation key whose output is connected to said means enabling preset of said up-down counter.

4. A control system according to claim 3, in which each frame includes a second identity indication detectable by said identity indicator and located on said videodisc at a position angularly spaced from said first-mentioned identity indication, and in which said means enabling preset of said up-down counter includes a second comparator having one input connected to said first memory, a third memory connected to the output of said first memory, the second input of said second comparator being connected to the output of said third memory, an AND circuit having one input connected to the output of said second comparator and a second input controlled by said validation key, and means connecting the output of said AND gate to the preset input of said up-down counter.

5. A control system according to claim 4, wherein said first and second identity indications for a television frame are angularly spaced by 180°.

* * * * *